US005595698A

United States Patent [19]

Nicholas et al.

[11] Patent Number: 5,595,698

[45] Date of Patent: Jan. 21, 1997

[54] METHOD OF MAKING MULTI-COLOR CONCRETE TILES

[75] Inventors: Thomas G. Nicholas, Anaheim Hills; Scott W. Fechner, Riverside, both of Calif.

[73] Assignee: Monier Roof Tile, Inc., Irvine, Calif.

[21] Appl. No.: 305,824

[22] Filed: Sep. 13, 1994

(Under 37 CFR 1.47)

Related U.S. Application Data

[62] Division of Ser. No. 99,211, Jul. 29, 1993, Pat. No. 5,406,766.

[51] Int. Cl.[6] .................................................... B29C 47/04

[52] U.S. Cl. .......................... 264/145; 264/148; 264/151; 264/157; 264/163; 264/211.11; 264/245; 264/256; 264/333

[58] Field of Search .................................... 264/245, 256, 264/333, 75, DIG. 31, 148, 177.11, 151, 157, 163, 211.11, 145–146

[56] References Cited

U.S. PATENT DOCUMENTS

| | | | |
|---|---|---|---|
| 1,802,378 | 4/1931 | Harshberger . | |
| 1,820,005 | 8/1931 | Maclean | 52/554 |
| 1,993,165 | 5/1935 | Harshberger . | |
| 2,064,473 | 12/1936 | Holdsworth . | |
| 2,162,886 | 6/1939 | Hamlin | 52/554 |
| 2,205,679 | 6/1940 | Ames, Jr. . | |
| 3,875,716 | 4/1975 | Eusemann . | |
| 3,955,907 | 5/1976 | Yamasita et al. | 264/157 |
| 4,040,211 | 8/1977 | Wotherspoon . | |
| 4,153,401 | 5/1979 | Longinotti | 425/134 |
| 4,666,648 | 5/1987 | Brittain | 264/145 |
| 4,692,293 | 9/1987 | Gray . | |
| 4,695,418 | 9/1987 | Baker et al. | 264/151 |
| 4,743,471 | 5/1988 | Shills, III | 52/311.1 |
| 4,752,520 | 6/1988 | Franklin | 264/212 |
| 4,753,766 | 6/1988 | Pinsolle | 264/245 X |
| 4,783,302 | 11/1988 | Kurimoto . | |
| 5,017,320 | 5/1991 | Garcia | 264/256 |
| 5,173,233 | 12/1992 | Kafarowski . | |
| 5,223,200 | 6/1993 | Schulz et al. | 264/157 |
| 5,262,108 | 11/1993 | Minke et al. | 264/245 X |

FOREIGN PATENT DOCUMENTS

| | | | |
|---|---|---|---|
| 0312938 | 10/1988 | European Pat. Off. . | |
| 0332737 | 9/1989 | European Pat. Off. | 264/157 |
| 3-120006 | 5/1991 | Japan | 264/245 |
| 2248578 | 4/1992 | United Kingdom . | |
| 8500135 | 1/1985 | WIPO . | |

OTHER PUBLICATIONS

Written Opinion in PCT/EP94/02292 (Int. Filing Date: Jul. 7, 1994), dated Apr. 18, 1995.

U.K. Patent Office Search Report, dated 29 Sep. 1994, re Application No. GB 9413829.4.

*Primary Examiner*—Jeffery R. Thurlow

*Attorney, Agent, or Firm*—Loeb & Loeb LLP

[57] ABSTRACT

A method of making the tile dispenses wet concrete having two different colors into a partitioned pug box for disposition onto opposite sides of a pallet, so that, the two different colors reside on opposite sides of the pallet in side-by-side relation. The wet concrete is metered and compressed by a roller and shaped by a slipper to provide the concrete tile with a desired cross-sectional shape, following which the concrete is then chopped by a knife assembly to form the individual tiles with desired edge configurations. The concrete is cured and then removed from the pallets to form the completed tiles. The method may be incorporated into a continuous process in which a succession of the pallets are passed by a conveyor beneath a making head assembly containing the partitioned pug box and the roller and slipper and then beneath a knife assembly to form a succession of the concrete tiles.

5 Claims, 5 Drawing Sheets

METHOD OF MAKING MULTI-COLOR CONCRETE TILES

CROSS-REFERENCE TO RELATED APPLICATION

This is a divisional application of Ser. No. 08/099,211, filed Jul. 29, 1993, now issued as U.S. Pat. No. 5,406,766 on Apr. 18, 1995.

BACKGROUND OF THE INVENTION

1. Field of the Invention

The present invention relates to multi-color concrete tiles, particularly concrete roof tiles, and to methods and apparatus for making same.

2. History of the Prior Art

Various methods have been employed for making concrete tiles, such as concrete roof tiles. The particular methods used depend on such things as the shape of the tiles being formed. Typically, wet concrete is dispensed onto a moving pallet, following which the pallet is passed under a roller and slipper to form and then shape the tile. A knife assembly chops and shapes the opposite edges of the tile. The wet concrete is cured and then removed from the pallet to provide the completed tile.

In a known method of making concrete roof tiles, a conveyor is used to transport the wet concrete from either a continuous mixer or a batch mixer to a making head assembly disposed above a conveyor containing a succession of moving pallets, arranged end-to-end. The pallets define the general shape of the tiles to be formed. As each pallet passes within the making head assembly, wet concrete is dispensed onto the pallet, with the help of a rotating roller which meters the concrete onto the pallet and compresses the wet concrete to a desired thickness. The pallet is then passed beneath a slipper which engages the wet concrete and has a profile selected to provide the concrete with a desired cross-sectional configuration. A knife assembly chops the continuous ribbon of concrete formed on the end-to-end succession of pallets to define the individual tiles and to shape the edges thereof. The pallets with the wet concrete extruded, compressed, shaped and chopped thereon are then separated and advanced to a racker, where the pallets are loaded onto racks for transport to a curing facility. The curing facility typically comprises an oven in which the tiles are heated at a desired temperature and for a desired period of time to cure the concrete. Following that, each concrete tile is removed from its supporting pallet to thereby provide the completed concrete tiles.

Concrete tiles formed in the manner described may be provided with a desired color or combination of colors. Typically, a coloring pigment is added to the wet concrete during the mixing process therefor, so that the concrete tiles will have a desired color. The tiles may also be colored by spraying a coloring slurry onto the tiles following extrusion of the tiles onto the pallets and while the concrete is still wet. A method for randomly coloring the tiles with different coloring slurries is described in U.S. Pat. No. 4,743,471 of Shills, which issued May 10, 1988 and which is commonly assigned with the present application.

In the method of random coloring described in U.S. Pat. No. 4,743,471, concrete roof tiles which are formed by conventional extrusion equipment on moving pallets are sequentially advanced from the making head assembly and the knife assembly by a conveyor to a base applicator which sprays a base coat of coloring slurry over essentially the entire top surface of each tile. One or more overspray applicators located downstream from the base applicator then spray additional colors over different portions of the top surfaces of the tiles in intermittent, randomly varying fashion so that the color pattern on each tile is essentially unique and is not repeated on any other tile. The overspray applicator includes a blade which is gated into contact with a rotating drum to apply coloring slurry to a rotating cylindrical brush in intermittent, randomly varying fashion and which is moved across the brush to vary the spray pattern across the width of the passing tiles in intermittent, randomly varying fashion.

While the coloring method described in U.S. Pat. No. 4,743,471 is useful in applying two or more colors to a tile in a pleasing artistic fashion, such technique cannot be used in the formation of all multi-color tiles. An example where such technique cannot be used is one in which two or more colors on a tile are to be distinctly separated along color dividing lines. In such instances, the technique described in U.S. Pat. No. 4,743,471 may not be capable of keeping two different and adjacent colors on a tile distinctly separated, inasmuch as such technique typically causes the two colors to spill over on each other in wavy, non-uniform, non-straight line fashion.

It would therefore be desirable to provide a method of making concrete tiles in which two different colors within a tile can be separated along a distinct color dividing line. This is particularly useful, for example, when forming tiles having one or more longitudinal grooves which separate the different colored portions thereof in a manner which creates the impression of a plurality of distinct and separate tiles of different color.

BRIEF SUMMARY OF THE INVENTION

Methods of and apparatus for making multi-color concrete tiles in accordance with the invention dispense wet concrete having different colors onto moving pallets. The concrete of different colors is dispensed substantially simultaneously, with the different colors in side-by-side relation. The wet concrete as so dispensed is metered and compressed by a roller, shaped by a slipper, and chopped by a knife assembly, before being cured and then separated from the pallets to provide the completed concrete tiles. Where desired, the slipper may be configured to provide the tiles with a longitudinal groove separating the two different colors on the opposite sides of each tile.

In a preferred method of making multi-color tiles in accordance with the invention, two quantities of wet concrete having different colors are provided using either a continuous mixing process or a batch process. The two different quantities of wet concrete are colored differently using different coloring pigments when preparing the two different quantities. The two different quantities of wet concrete are delivered to a making head assembly by a pair of conveyors which continuously deliver and dispense the wet concrete from the two different quantities into the making head assembly. The making head assembly is located along a continuously moving conveyor which transports a succession of pallets defining the basic shape of the concrete tiles to be formed. Within the making head assembly, the wet concrete from the two different conveyors is discharged into a pug box on opposite sides of a central partition within the pug box. The wet concrete on opposite sides of the central partition within the pug box is dispensed onto the upper surface of each pallet passing therebelow, in continuous fashion. The central partition of the pug box serves to separate the two different colors as the wet concrete is dispensed onto each pallet. Each pallet passes beneath a cylindrical roller which meters and compresses the concrete, just ahead of a slipper which provides the concrete with the desired cross-sectional configuration. Knives within a knife assembly chop the front and rear edges of the concrete ribbon on each pallet to define the individual tiles and to provide each tile with desired front and rear edge configurations. Each pallet is then separated from the string of end-to-end pallets and transported to an oven to cure the concrete. Following that, the cured concrete is separated from the pallet to provide the completed tile.

Where desired, the slipper can be configured to provide each concrete tile with a longitudinal groove separating the two different colors. This enhances the ability of each tile to provide the appearance of two different tiles of different color. The knife assembly can be employed to shape the front edge of each tile so that it is stepped between opposite left and right portions of different color.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

DETAILED DESCRIPTION

Figure 1:
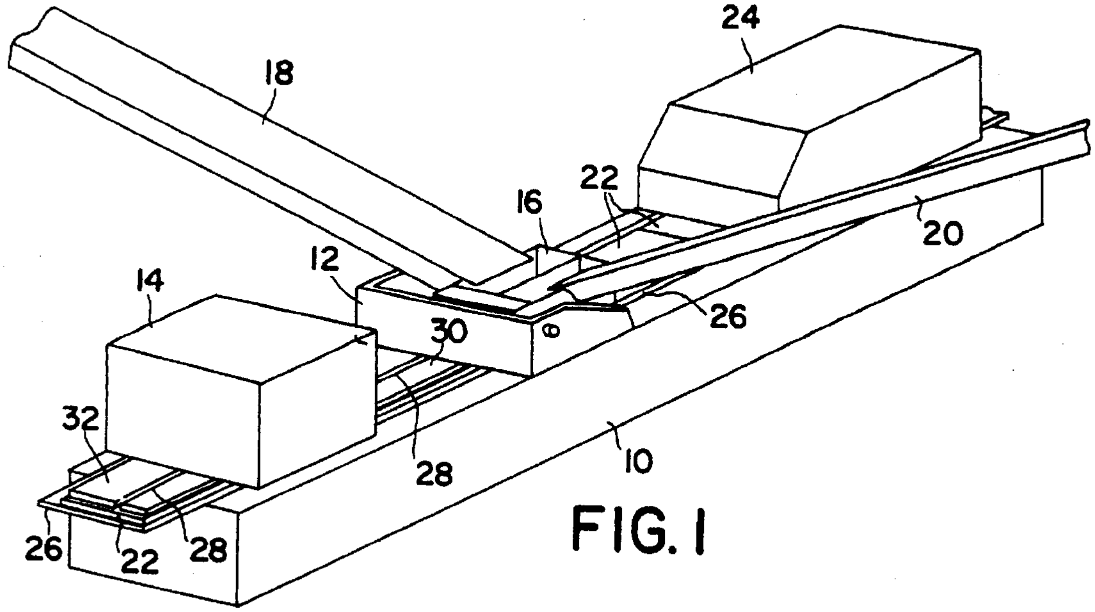
FIG. 1 is a perspective view of a portion of a pallet conveyor which includes apparatus for making multi-color concrete tiles in accordance with the invention.

FIG. 1 shows a portion of a pallet conveyor 10 which includes apparatus for making multi-color concrete tiles in accordance with the invention. Such apparatus includes a making head assembly 12 and a knife assembly 14. As described in detail hereafter, the making head assembly 12 includes a partitioned pug box 16 for receiving wet concrete mixes of two different colors in opposite sides thereof. The wet concrete of two different colors is delivered by opposite conveyors 18 and 20. The pug box 16 dispenses the wet concrete of two different colors onto opposite sides of a succession of pallets 22 which move beneath the making head assembly 12. The wet concrete of two different colors is dispensed onto each of the moving pallets substantially simultaneously and in side-by-side relation. A propulsion unit 24 serves to propel a conveyor 26 which mounts the pallets 22 thereon in end-to-end relation.

Following dispensing of the wet concretes of two different colors from the conveyors 18 and 20 onto the opposite sides of the pallets 22, using the pug box 16, the pallets 22 are passed beneath a roller and then a slipper (not shown in FIG. 1) which comprise part of the making head assembly 12. As described in detail hereafter, the roller serves to meter the wet concrete onto the pallets 22 and to compress the concrete, with the slipper then providing the wet concrete with a desired cross-sectional configuration. In this manner, the making head assembly 12 forms a continuous two-color ribbon of concrete on the succession of end-to-end pallets 22 on the pallet conveyor 26. As described hereafter, the slipper within the making head assembly 12 forms a longitudinal beveled groove 28 in the concrete ribbon at the juncture between the two different colors.

The pallets 22 are advanced from the making head assembly 12 to the knife assembly 14. The knife assembly 14 which operates in conventional fashion includes a first knife for chopping the continuous ribbon of concrete adjacent the front and rear edges of each pallet 22 to form separate concrete tiles. A second knife, which is described in detail hereafter in connection with FIG. 10, then shapes the front edge of each tile thus formed to provide the front edge with a desired configuration.

Thus, the making head assembly 12 forms a continuous ribbon 30 of concrete on the succession of pallets 22. The continuous ribbon of concrete 30 is then chopped by the knife assembly 14 into a succession of individual tiles 32, each of which resides on a different one of the pallets 22. After passage of the pallets 22 beneath the knife assembly 14, the pallets 22 are separated from each other before being delivered to a racker. At the racker, the pallets 22 are removed from the pallet conveyor 10 and are transported to ovens for curing of the wet concrete. Following the curing process, the cured concrete is separated from the pallets 22 to form the completed tiles. The racking and curing operations are neither shown nor described in detail herein, inasmuch as they are conventional in nature.

Figure 2:
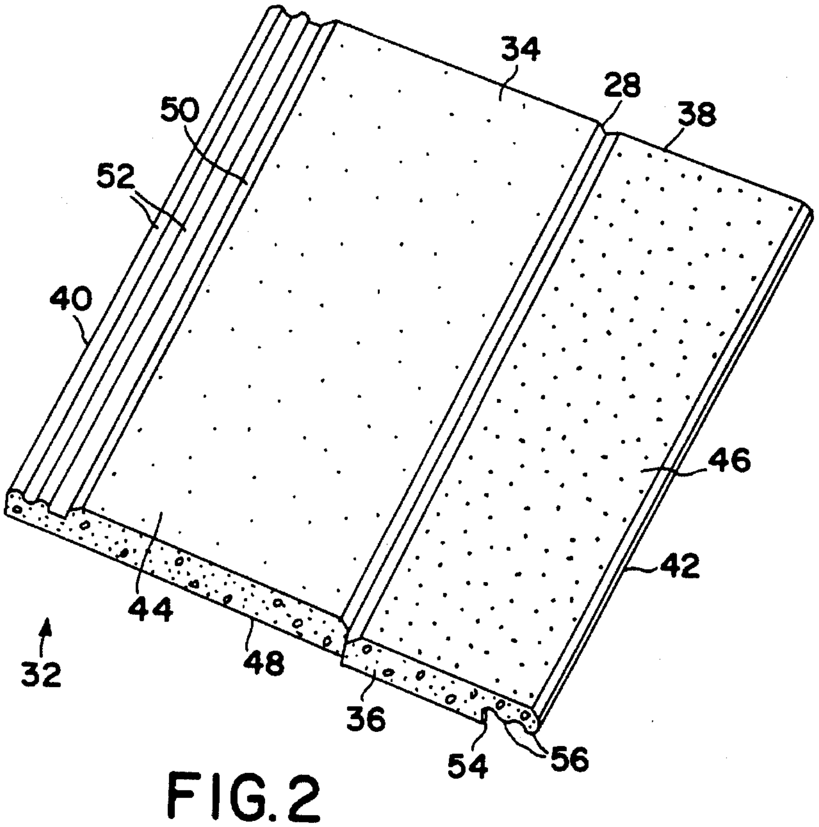
FIG. 2 is a perspective view of a multi-color concrete roof tile in accordance with the invention.

FIG. 2 shows one of the concrete roof tiles 32 in accordance with the invention. The tile 32 is of relatively, thin, generally planar configuration, and has a top surface 34, front and rear edges 36 and 38 respectively, and opposite side edges 40 and 42. The top surface 34 of the tile 32 has the longitudinal beveled groove 28 therein. The groove 28 divides the tile 32 into a left side portion 44 having a first color and a right side portion 46 having a second color different from the first color. The groove 28 serves as a dividing line between the two different colors of the tile 32. Because of the manner in which the tile 32 is made in accordance with the invention, the first color of the left side portion 44 extends substantially entirely throughout the left side portion 44, including the thickness thereof between the top surface 34 and an opposite bottom surface 48 of the tile 32. Similarly, the second color of the right side portion 44 extends substantially entirely throughout the right side portion, including the thickness of the right side portion between the top surface 34 and the bottom surface 48.

The front and rear edges 36 and 38 of the tile 32 are formed by the knife assembly 14 of the apparatus of FIG. 1.

As shown in FIG. 2, the rear edge 38 is essentially straight across the width of the tile 32. However, the front edge 36 is stepped at the groove 28 which forms the juncture between the left and right side portions 44 and 46, such that the right side portion 46 of the tile 32 has a length in the longitudinal direction of the tile 32 which is slightly greater than the length of the left side portion 44. This feature combines with the two different colors of concrete on opposite sides of the groove 28 to enable the tile 32 to create the appearance of being comprised of two different tiles of different color. As a result, the tiles 32 can be installed on a roof in a relatively simple and efficient manner, while at the same time providing various different artistic effects.

In addition to the longitudinal beveled groove 28, the tile 32 has a beveled edge 50 which forms a part of the side edge 40 together with a pair of parallel, spaced-apart, upstanding ridges 52. The opposite side edge 42 of the tile 32 is of like configuration, and comprises a beveled edge 54 and a pair of ridges 56. However, the beveled edge 54 and the ridges 56 of the side edge 42 are downwardly facing, whereas the beveled edge 50 and the ridges 52 of the side edge 40 are upwardly facing. In this manner, the side edge 42 of the tile 32 can be disposed over the side edge 40 of an adjacent tile to provide a conforming, overlapping fit in a row of the tiles 32.

As described in connection with FIG. 1, the making head assembly 12 includes the pug box 16 which receives the concretes of first and second colors within the opposite sides thereof from the conveyors 18 and 20. The pug box 16 is shown in detail in FIG. 3.

Figure 3:
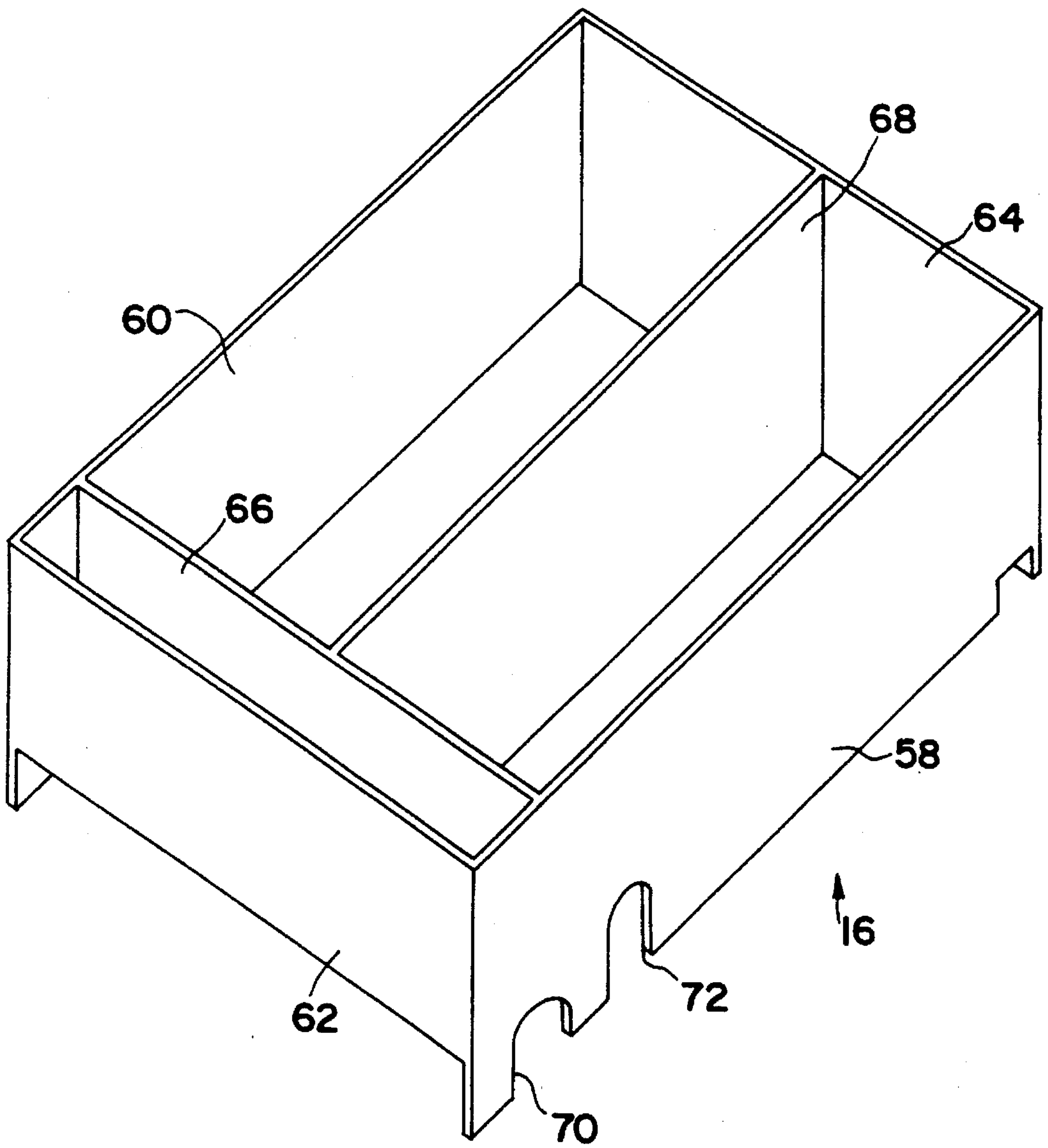
FIG. 3 is a perspective view of a pug box used in the making head assembly of the apparatus of FIG. 1.

As shown in FIG. 3, the pug box 16 is of open, generally rectangular configuration and includes a pair of opposite sides 58 and 60 extending between a front 62 and an opposite rear 64 of the pug box 16. A transverse partition 66 extends between the opposite sides 58 and 60 adjacent to the front 62. The transverse partition 66 is generally parallel to and spaced-apart from the front 62. The pug box 16 also includes a longitudinal partition 68 extending between the transverse partition 66 and the rear 64 so as to be generally parallel with and spaced-apart from the opposite sides 58 and 60. The longitudinal partition 68 is spaced slightly closer to the side 58 than to the side 60, in the same way that the groove 28 is closer to the side edge 42 than to the side edge 40 of the tile 32 shown in FIG. 2.

The side 58 of the pug box 16 is provided with a first slot 70 in a lower edge thereof between the front 62 and the transverse partition 66. While not shown in FIG. 3, the opposite side 60 is also provided with a first slot in a lower edge thereof between the front 62 and the transverse partition 66. The slot 70 in the side 58 and the corresponding slot in the opposite side 60 receive a roller, as described hereafter in connection with FIGS. 4–7. The side 58 is also provided with a second slot 72 in the lower edge thereof which is adjacent the first slot 70. Although not shown in FIG. 3, the longitudinal partition 68 and the opposite side 60 are provided with corresponding slots in the lower edges thereof. The slot 72 Within the side 58 and the corresponding slots within the longitudinal partition 68 and the opposite side 60 receive a pack shaft, as described in detail hereafter in connection with FIGS. 4–7.

As previously described in connection with FIG. 1, the conveyor 18 delivers wet concrete having a first color to one side of the pug box 16, while the conveyor 20 delivers wet concrete having the second color different from the first color to the other side of the pug box 16. The different colored concretes provided to the pug box 16 by the conveyors 18 and 20 may be provided to the conveyors 18 and 20 using continuous mixers or batch mixers. The desired colors are provided by adding coloring pigments to the concrete mixers, in conventional fashion. The wet concrete of first color is delivered by the conveyor 18 into the space between the longitudinal partition 68 and the side 60 for dispensing onto the pallets 22 passing therebelow. The wet concrete color of second color delivered by the conveyor 20 is delivered into the space between the longitudinal partition 68 and the side 58 for dispensing onto the pallets 22 passing therebelow.

The making head assembly 12 is shown in detail in FIGS. 4-7 and includes a pair of opposite side plates 74 and 76 on opposite sides of a slipper bridge 78. The pug box 16 of FIG. 3 is disposed within the frame defined by the side plates 74 and 76 and the slipper bridge 78. The opposite side plates 74 and 76 rotatably mount a roller shaft 79 therein, which shaft mounts a roller 80 of cylindrical configuration thereon between the side plates 74 and 76. The roller shaft 79 extends outside of the side plate 76 and mounts a sprocket 82 thereon for rotatably driving the roller shaft 79. The opposite end of the roller shaft 79 extends to the outside of the side plate 74 and mounts a sprocket 84 thereon. Rotational driving of the sprocket 82 by a motor or other driving means (not shown) rotates the roller shaft 79 and the roller 80. Such driving also rotates the sprocket 84, so as to rotatably drive a pack shaft 86 via a sprocket 88 coupled to the sprocket 84 by a chain 90. Like the roller shaft 79, the pack shaft 86 extends between and is rotatably journaled within the opposite side plates 74 and 76. The pack shaft 86 has a plurality of wear sleeves 92 mounted thereon together with a plurality of pins 94 extending outwardly therefrom.

Figure 6:
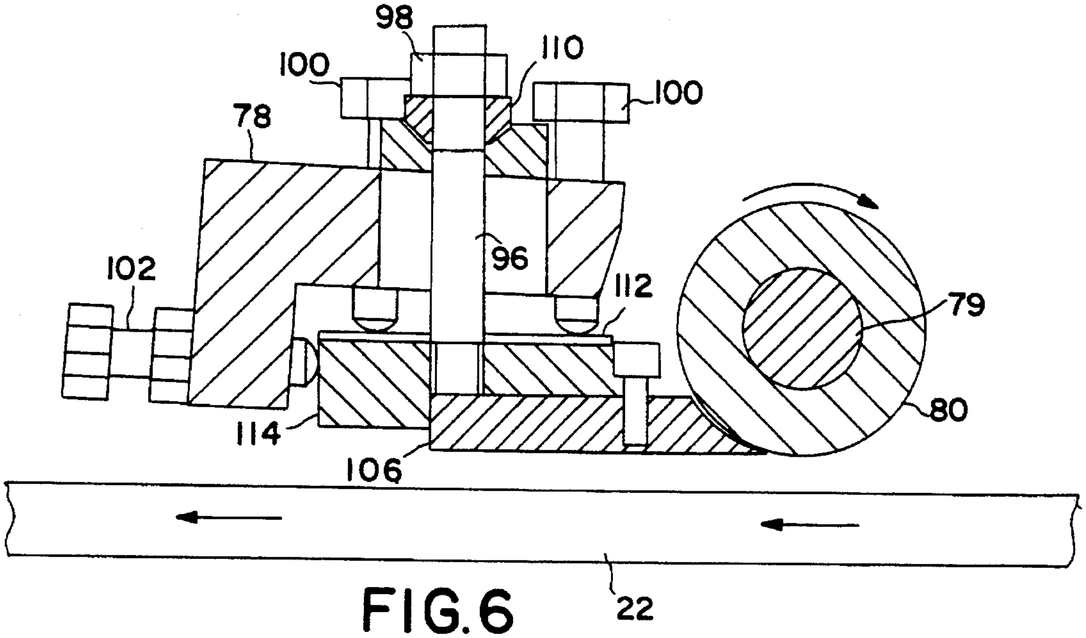
FIG. 6 is a sectional view of a portion of the making head assembly of FIG. 4 taken along the lines 6—6 of FIG. 4.

As described hereafter in connection with FIG. 6, the slipper bridge 78 serves to mount a slipper thereunder using slipper studs 96 which extend through the slipper bridge 78 and receive nuts 98 at the upper ends thereof. Adjustment of the slipper is accomplished using adjusting bolts 100 extending downwardly through the slipper bridge 78, and by using adjusting bolts 102 extending through the front side of the slipper bridge 78, The opposite side plates 74 and 76 of the making head assembly 12 are mounted on and secured to the pallet conveyor 10 using lock bolts, with one such bolt 104 being shown in FIG. 5.

As previously described, the wet concrete of first color is delivered by the conveyor 18 into the space between the longitudinal partition 68 and the side 60 of the pug box 16. The wet concrete having the second color is delivered by the conveyor 20 into the space between the longitudinal partition 68 and the side 58 of the pug box 16. The longitudinal partition 68 extends downwardly to a position adjacent to and just above the top surface of the pallets 22, as do the sides 58 and 60.

It will therefore be appreciated that the wet concrete of two different colors is dispensed onto the upper surface of the pallet 22 substantially simultaneously and so that the two different colors reside on the surface of the pallet 22 in side-by-side relation. Because the conveyors 18 and 20 continuously deliver wet concrete to the pug box 16 so as to continuously dispense the concrete onto the pallets 22 on opposite sides of the longitudinal partition 68, and because the pallets 22 are moved along the conveyor 26 therefor in end-to-end relationship, the making head assembly 12 serves to continuously dispense a two-color ribbon of wet concrete onto the succession of pallets 22.

The dispensing process is assisted by the packer shaft 86 with the pins thereon that move in response to rotation of the shaft 86. The pins 94 serve to break up and relatively uniformly distribute the concrete onto the passing pallets 22 across the width of the pallets 22. At the same time, the rotating roller 80 serves to meter the concrete across the widths of the pallets 22, while at the same time compressing and compacting the concrete as described hereafter in connection with FIG. 6.

Referring to FIG. 6, the roller 80 is shown therein relative to one of the pallets 22. As seen in FIG. 6, the roller 80 rotates in a clockwise direction. As the wet concrete is dispensed onto the upper surface of the pallet 22, the rotating roller 80 functions to meter the concrete onto the upper surface of the pallet 22 while at the same time compressing and compacting the wet concrete. Immediately after passing under the roller 80, the wet concrete is conveyed along the underside of an adjacent slipper 106. The slipper 106 functions to provide the ribbon of concrete formed on the upper surfaces of the pallets 22 with a desired cross-sectional shape. As described hereafter in connection with FIGS. 8 and 9, the slipper 106 determines the cross-sectional shape or profile of the tile being formed, including the longitudinal beveled groove 28 and the opposite side edges 40 and 42 shown in FIG. 2.

As shown in FIG. 6, the slipper 106 is coupled to the slipper bridge 78 by the plurality of slipper studs 96, one of which is shown in FIG. 6. The slipper stud 96 extends upwardly through an aperture 108 in the slipper bridge 78, where it receives a spherical washer 110 and then one of the nuts 98. A slipper pressure plate 112 disposed over the upper surface of a slipper back plate 114 to which the slipper 106 is coupled is engaged by the lower ends of the adjusting bolts 100 which extend downwardly through the slipper bridge 78. An end surface of the slipper back plate 114 is engaged by the inner ends of the adjusting bolts 102 which extend through the side surface of the slipper bridge 78. Manipulation of the adjusting bolts 100 and 102 provides for adjustment of the position of the slipper 106 relative to the passing pallet 22.

Figure 4:
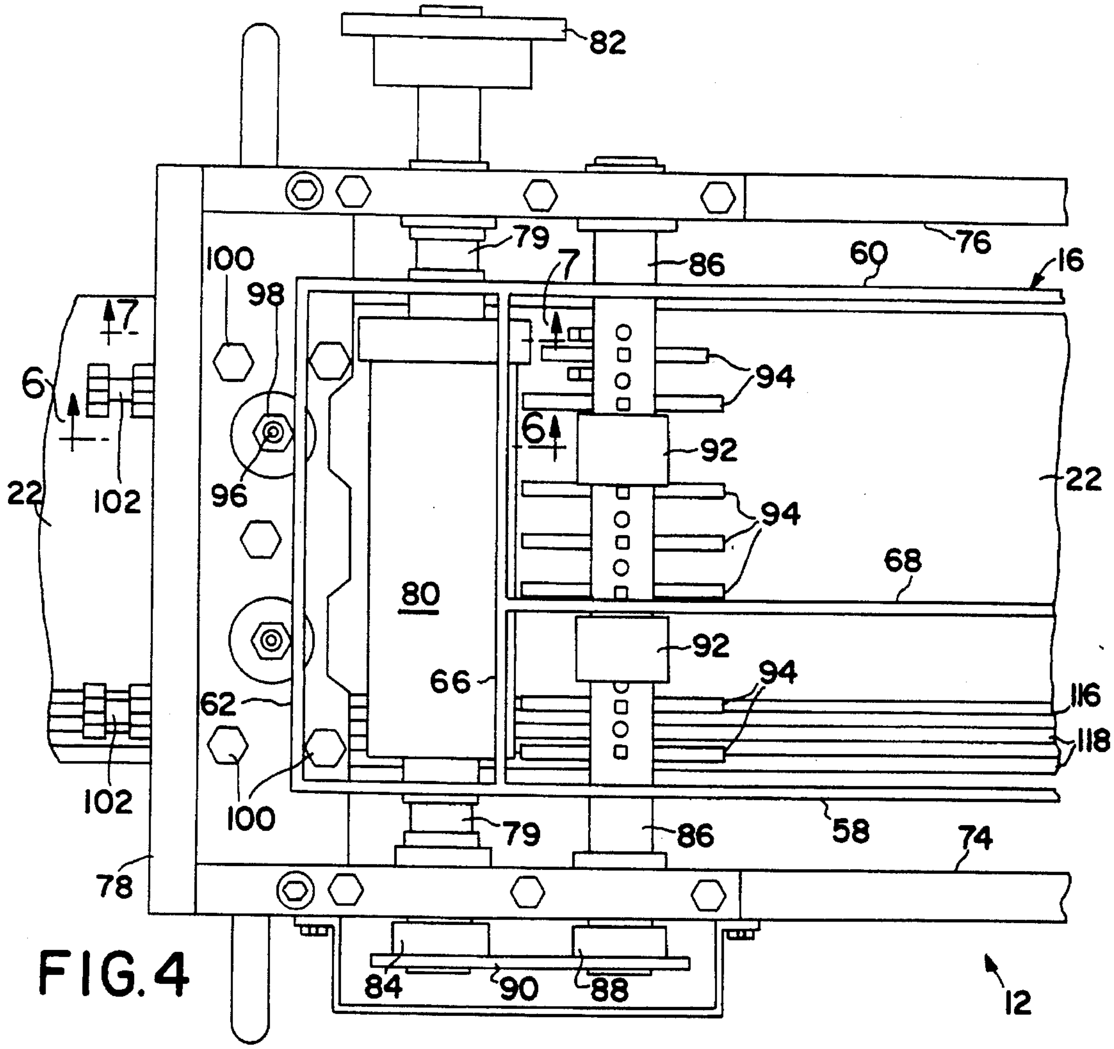
FIG. 4 is a top view of the making head assembly of the apparatus of FIG. 1 showing a portion of the pug box of FIG. 3 disposed over a succession of pallets passing therebelow.
Figure 5:
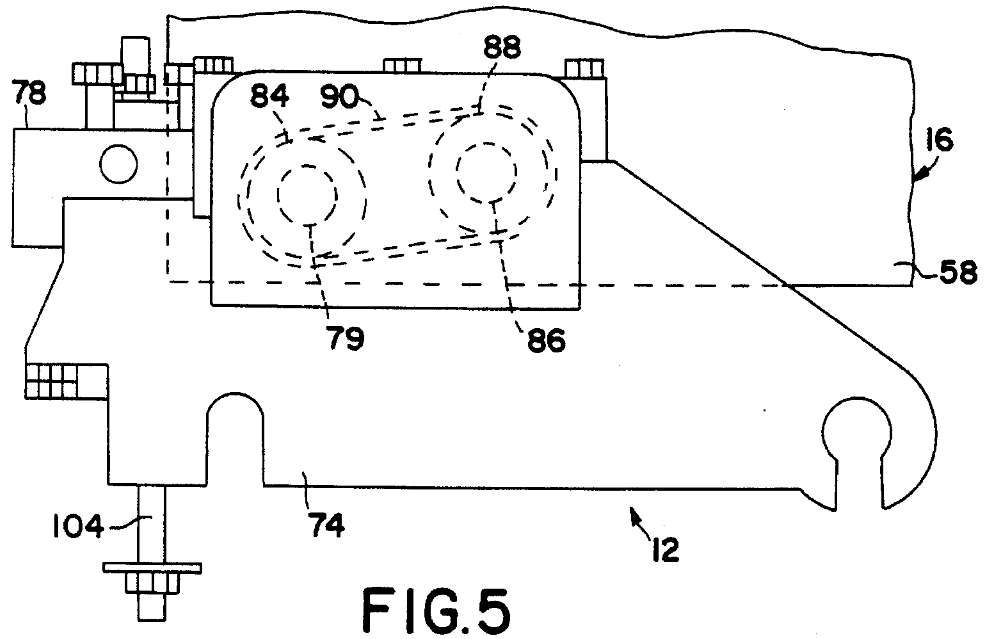
FIG. 5 is a side view of the making head assembly of FIG. 4.

As seen in FIG. 4, the pallet 22 has a raised side edge portion 116 comprised of a plurality of generally parallel, spaced-apart ridges 118. As the wet concrete is compacted onto the pallet 22 by the roller 80 and then shaped by the slipper 106, the wet concrete is pressed onto the raised side edge portion 116 of the pallet 22 such that the troughs between the ridges 118 thereof form the ridges 56 of the side edge 42 of the tile 32 being formed.

Figure 7:
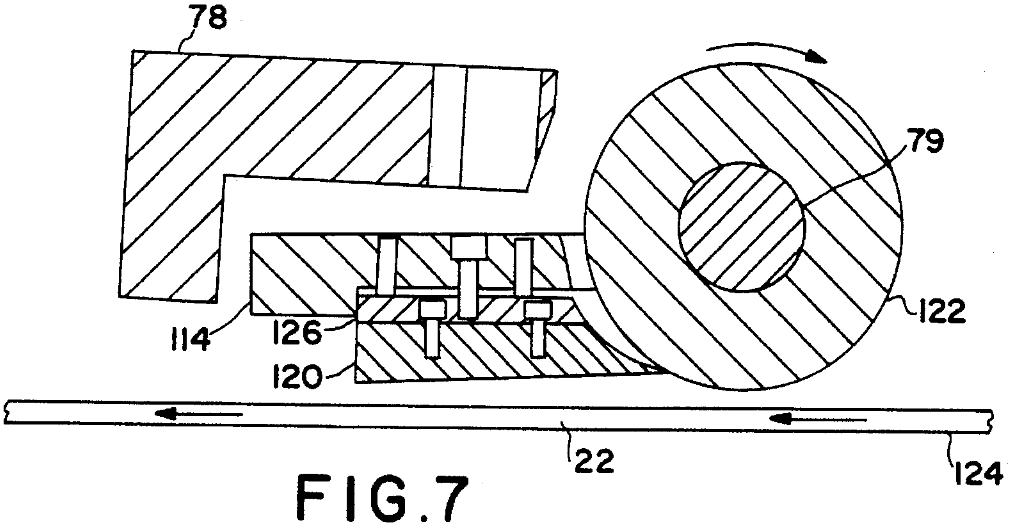
FIG. 7 is a sectional view of a portion of the making head assembly of FIG. 4 taken along the lines 7—7 of FIG. 4.

At the same time, the ridges 52 in the side edge 40 of the tile 32 are formed by a lock block 120 disposed at one end of the slipper 106, in conjunction with a lock ring 122 mounted on the roller shaft 79 at one end of the roller 80. The wet concrete beneath the lock ring 122 and the lock block 120 is supported by a side edge portion 124 of the pallet 22 opposite the raised side edge portion 116. The side edge portion 124 has an upper surface generally continuous with the upper surface of the main portion of the pallet 22. Because the side edge 40 of the tile 32 and its ridges 52 are recessed downwardly from the top surface 34 of the tile 32, the block ring 122 which is of generally cylindrical configuration is larger in diameter than the roller 80 so as to extend downwardly by a greater distance. As shown in FIG. 7, the lock ring 122 is spaced closer to the upper surface of the side edge portion 124 than is the roller 80 to the upper surface of the central portion of the pallet 22 as shown in FIG. 6. The lock block 120 is also shown in FIG. 7. The lock block 120 which is disposed immediately behind the lock ring 122 is coupled to the slipper back plate 114 by a lock block backing piece 126 to which the lock block 120 is attached.

Figure 8:
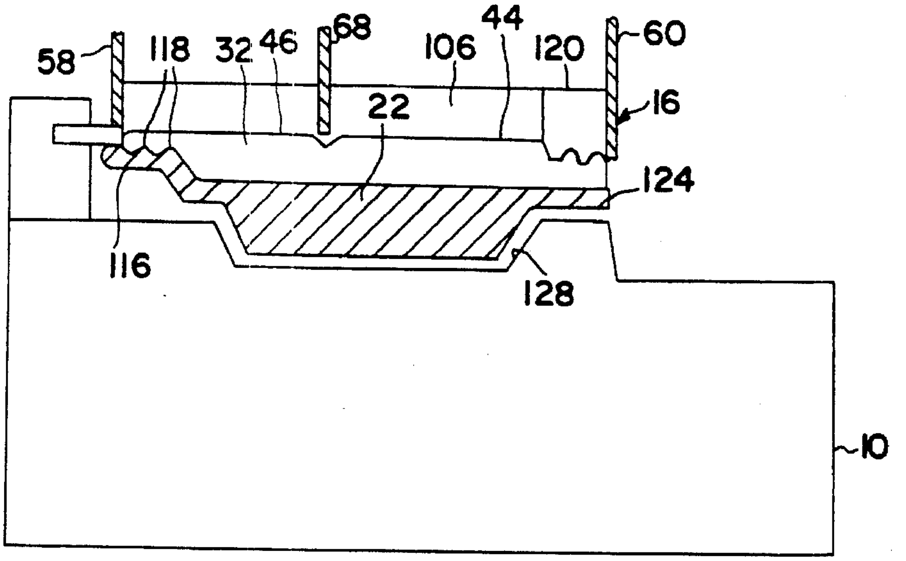
FIG. 8 is a sectional view of the conveyor apparatus of FIG. 1 showing a pallet together with wet concrete dispensed thereon and a portion of the pug box of FIG. 3.

FIG. 8 is a cross-sectional view of the pallet conveyor 10, showing a pallet 22 as it moves within a channel 128 in the pallet conveyor 10. The opposite sides 58 and 60 as well as the longitudinal partition 68 of the pug box 16 are shown in FIG. 8. Wet concrete having the first color is dispensed by the conveyor 18 into the space between the longitudinal partition 68 and the side 60 so as to fall onto a portion of the pallet 22 including the side edge portion 124 thereof to form the left side portion 44 of the tile 32. The pack shaft 86 and the roller 80, which are not shown in FIG. 8, mix, meter and compact the concrete, in the manner previously described.

Simultaneously with the dispensing of the wet concrete of first color onto the pallet 22 between the longitudinal partition 68 and the side 60, the wet concrete having a second color different from the first color is dispensed by the conveyor 20 into the space between the longitudinal partition 68 and the side 58 for disposition onto a portion of the pallet 22 to form the right side portion 46 of the tile 32. Again, the pack shaft 86 and the roller 80 mix, meter and compress the wet concrete onto a portion of the pallet 22 including the raised side edge portion 116 with its ridges 118. The longitudinal partition 68 of the pug box 16 extends downwardly almost to the top surface 34 of the tile 32 being formed. This serves to separate the wet concretes of the two different colors along a relatively fine dividing line defined by the longitudinal beveled groove 28 in the tile 32.

Figure 9:
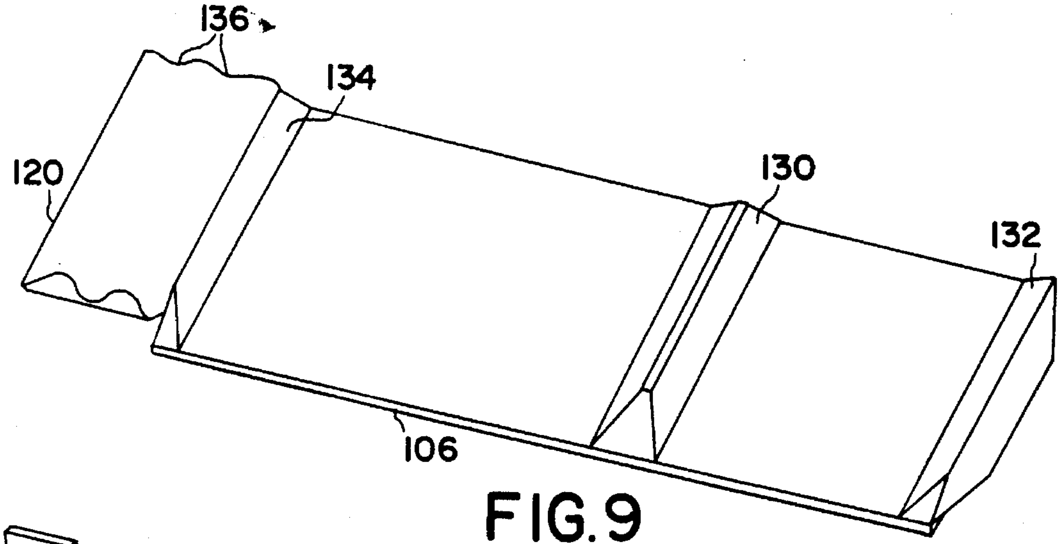
FIG. 9 is a bottom perspective view of the slipper and associated lock box of the making head assembly of FIG. 4.

The longitudinal beveled groove 28 in the tile 32 is formed by a downwardly extending ridge 130 on the bottom surface of the slipper 106. The ridge 130 is shown in FIG. 9 together with ridges 132 and 134 at opposite ends of the slipper 106. The ridge 132 forms the beveled edge at the side edge 42 of the tile 32. The opposite ridge 134 forms the beveled edge 50 at the side edge 40 of the tile 32.

As shown in FIG. 9, which is a lower perspective view of the slipper 106 together with the lock block 120, the lock block 120 is coupled to an end of the slipper 106 adjacent the ridge 134 in the slipper. It was previously noted that the lock block 120 combines with the lock ring 122 to form the side edge 40 of the tile 32. A lower surface of the lock block 120 contains grooves 136 therein which form the ridges 52 in the side edge 40 of the tile 32.

As previously described in connection with FIG. 1, the knife assembly 14 which is of conventional design includes knives which cut or chop and then shape the front and rear edges 36 and 38 of the tile 32 within the continuous ribbon of concrete 30 provided on the pallets 22 by the making head assembly 12. A first knife (not shown) within the knife assembly 14 chops the concrete ribbon 30 to form the front and rear edges 36 and 38 of each tile 32, following which a second knife is employed to shape the front edge 36. Although the knife assembly 14 operates in conventional fashion, the second knife is uniquely configured in accordance with the present invention so as to achieve the stepped front edge 36 of the tile 32 shown in FIG. 2. The second knife 138 is shown in FIG. 10.

Figure 10:
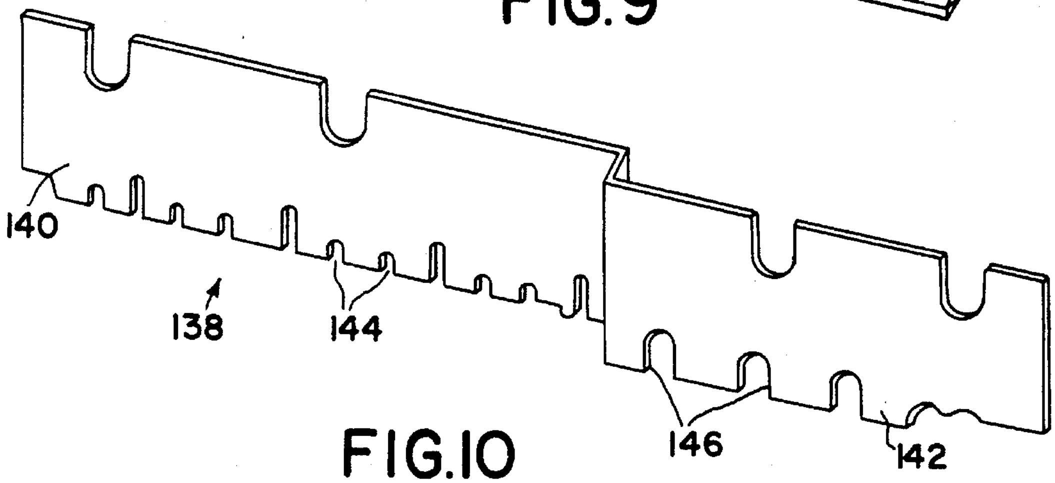
FIG. 10 is a perspective view of one of the knives within a knife assembly of the apparatus of FIG. 1 which is used to shape the front edge of the tile shown in FIG. 2.

As seen in FIG. 10, the second knife 138 is of stepped configuration and comprises a first portion 140 offset from a second portion 142. The knife assembly 14 provides a downward motion of the second knife 138 onto the wet concrete to shape the front edge 36 of the tile 32. The portion 140 of the second knife 138 shapes the front edge 36 of the tile 32 across the width of the left side portion 44, while the portion 142 of the second knife 138 shapes the front edge 36 across the width of the right side portion 46 of the tile 32.

The stepped configuration of the second knife 138, with the offset portions 140 and 142 thereof, provides the stepped configuration of the front edge 36 of the tile 32. In addition, the opposite portions of the front edge 36 are provided with a somewhat roughened appearance by a plurality of spaced-apart slots of different size in a lower edge of the opposite portions 140 and 142 of the second knife 138. As shown in FIG. 10, the portion 140 is provided with a series of slots 144 therein to provide the front edge 36 along the left side portion 44 of the tile 32 with a roughened effect. A slightly greater roughened effect is provided along the front edge 36 at the right side portion 46 of the tile 32 by a plurality of slots 146 in the portion 142 which are larger than the slots 144 in the portion 140 of the second knife 138.

While various forms and modifications have been suggested, it will be appreciated that the invention is not limited thereto but encompasses all expedients and variations falling within the scope of the appended claims.

We claim:

1. A method of making a concrete tile comprising the steps of:

providing a pallet defining the general shape of a tile to be formed;

dispensing wet concrete having a first color onto the pallet to form a first concrete mass of the first color on the pallet,;

substantially simultaneously with dispensing wet concrete having a first color, dispensing wet concrete having a second color different from the first color onto the pallet to form a second concrete mass of the second color on the pallet which is separate from and abuts the first concrete mass along a substantially straight line;

compressing and shaping the wet concrete on the pallet; and curing the wet concrete to form a concrete tile in which the first and second concrete masses form separate and opposite portions of the tile of different color joining each other along the substantially straight line.

2. A method in accordance with claim 1, wherein the step of compressing and shaping the wet concrete on the pallet comprises the steps of rolling the wet concrete dispensed onto the pallet to compress the first and second concrete masses individually as well as against each other, and passing the pallet under a slipper to form the rolled wet concrete into a desired cross-sectional configuration.

3. A method in accordance with claim 2, wherein the slipper is configured to form a groove in the rolled wet concrete extending along the substantially straight line.

4. A method in accordance with claim 2, comprising the further step of chopping the wet concrete following passing of the pallet under a slipper, to form opposite edges of desired configuration at the wet concrete.

5. A method of making a two-color concrete tile comprising the steps of:

providing a pallet defining the general shape of a concrete tile to be formed;

providing a making head assembly;

continuously moving the pallet under the making head assembly while substantially simultaneously dispensing wet concrete of two different colors onto the pallet to form opposite masses of concrete of the two different colors which are separate from and abut each other in side-by-side relation along a substantially straight line;

moving the pallet beneath a roller within the making head assembly to compact the opposite masses of concrete individually and against each other along the substantially straight line; and moving the pallet beneath a slipper within the making head assembly to form the wet concrete on the pallet into a desired shape.

* * * * *